US008696458B2

(12) United States Patent
Foxlin et al.

(10) Patent No.: US 8,696,458 B2
(45) Date of Patent: Apr. 15, 2014

(54) MOTION TRACKING SYSTEM AND METHOD USING CAMERA AND NON-CAMERA SENSORS

(75) Inventors: Eric Foxlin, Lexington, MA (US); Dean Wormell, Westford, MA (US); Thomas C. Browne, North Andover, MA (US); Michael Donfrancesco, Westborough, MA (US)

(73) Assignee: Thales Visionix, Inc., Clarksburg, MD (US)

( * ) Notice: Subject to any disclaimer, the term of this patent is extended or adjusted under 35 U.S.C. 154(b) by 1076 days.

(21) Appl. No.: 12/032,079

(22) Filed: Feb. 15, 2008

(65) Prior Publication Data

US 2009/0209343 A1  Aug. 20, 2009

(51) Int. Cl.
A63F 9/24 (2006.01)

(52) U.S. Cl.
USPC ............................. 463/36; 345/156; 382/103

(58) Field of Classification Search
USPC ............................. 463/36; 345/156; 382/103
See application file for complete search history.

(56) References Cited

U.S. PATENT DOCUMENTS

| 5,615,132 | A | 3/1997 | Horton et al. |
| 5,645,077 | A | 7/1997 | Foxlin |
| 6,176,837 | B1 | 1/2001 | Foxlin |
| 6,373,047 | B1 | 4/2002 | Adan et al. |
| 6,474,159 | B1 | 11/2002 | Foxlin et al. |
| 6,681,629 | B2 | 1/2004 | Foxlin et al. |
| 6,786,877 | B2 * | 9/2004 | Foxlin ............................. 600/587 |
| 6,922,632 | B2 | 7/2005 | Foxlin |
| 6,982,697 | B2 * | 1/2006 | Wilson et al. ................. 345/156 |
| 7,725,253 | B2 * | 5/2010 | Foxlin ............................. 701/207 |
| 7,918,733 | B2 * | 4/2011 | Zalewski et al. ................. 463/39 |
| 7,961,909 | B2 | 6/2011 | Mandella et al. |
| 2001/0043737 | A1 | 11/2001 | Rogina et al. |
| 2002/0049530 | A1 | 4/2002 | Poropat |
| 2002/0103617 | A1 * | 8/2002 | Uchiyama et al. ............. 702/150 |
| 2003/0045816 | A1 * | 3/2003 | Foxlin ............................. 600/595 |
| 2004/0032970 | A1 | 2/2004 | Kiraly |
| 2005/0059488 | A1 * | 3/2005 | Larsen et al. .................... 463/36 |
| 2006/0094955 | A1 * | 5/2006 | Satoh et al. ..................... 600/426 |
| 2007/0060228 | A1 | 3/2007 | Akasaka et al. |
| 2007/0081695 | A1 | 4/2007 | Foxlin et al. |
| 2009/0058850 | A1 * | 3/2009 | Fun ................................. 345/419 |
| 2010/0316253 | A1 * | 12/2010 | Yang et al. ..................... 382/103 |

OTHER PUBLICATIONS

Authorized officer Lee W. Young, International Search Report and Written Opinion, in PCT/US06/38460, dated Oct. 16, 2007, 11 pages.
Frey et al., "Off-the-Shelf, Real-Time, Human Body Motion Capture for Synthetic Environments", Computer Science Department, Navel Postgraduate School, Monterey, CA (1995).
Haralick and Shapiro, "Computer and Robot Vision v.2", Addison-Wesley Publishing Company, pp. 66-68 (1993).

(Continued)

Primary Examiner — Lawrence Galka
(74) Attorney, Agent, or Firm — Arent Fox LLP

(57) ABSTRACT

Systems and methods for tracking the motion of a game controller and a player's body part are disclosed. The method includes receiving a video signal from a webcam, generating movement data corresponding to the motion of the game controller, tracking first predetermined degrees of freedom of motion of the body part, generating feature location data based on a location of at least one identifiable visual feature of the game controller, and estimating second predetermined degrees of freedom of a motion of the game controller.

24 Claims, 2 Drawing Sheets

(56) References Cited

OTHER PUBLICATIONS

Kotake et al., "A Hybrid and Linear Registration Method Utilizing Inclination Constraint", Proceedings of the Fourth IEEE and ACM International Symposium on Mixed and Augmented Reality (ISMAR 2005), pp. 140-149 Washington, D.C., Oct. 2005.

Satoh et al., "A Head Tracking Method Using Bird's-Eye View Camera and Gyroscope", Proceedings of the Third IEEE and ACM International Symposium on Mixed and Augmented Reality (ISMAR 2004), pp. 202-211 Washington, D.C., Nov. 2004.

van Liere and Mulder, "Optical Tracking Using Projective Invariant Marker Pattern Properties", IEEE Virtual Reality 2003 Conference, Mar. 22-26, Los Angeles, 2003.

* cited by examiner

MOTION TRACKING SYSTEM AND METHOD USING CAMERA AND NON-CAMERA SENSORS

BACKGROUND

This description relates to game controllers and 3D input devices for virtual reality.

Console garners have typically interacted with their games through a handheld game controller having a variety of buttons, rocker switches and sometimes joysticks, but usually no motion sensing capability. Several years ago, game controllers incorporated a two-axis accelerometer for tilt sensing to allow a player to control bank and elevation by tilting the gamepad left/right and up/down. More recently, Nintendo has realized success in the console games market with its Wii platform. A key component of this success is the motion sensing capabilities of the Wii Remote and Nunchuk controllers. These two input devices have allowed consumers to interact with games in new and highly intuitive ways. The devices keep costs extremely low by including just a single tri-axial MEMS accelerometer, but the addition of the third axis allows some degree of gestural tracking in three dimensions, rather than just tilt control. For example, the system can interpret the timing and magnitude of a tennis swing, and some aspects of the direction (rising/falling slope can be coarsely determined, but not the azimuth direction)

SUMMARY

Disclosed is a system for tracking the motion of a game controller and a player's body part. In an aspect, the system includes a webcam positioned to have a view of at least one of the game controller and the body part, a sensor coupled to the game controller, the sensor configured to generate movement data, a computer-vision module to process a video signal from the webcam, and in response to the video signal, to track first predetermined degrees of freedom of motion of the body part, an image-processing module to process the video signal, and in response to the video signal, to generate feature location data based on a location of at least one identifiable visual feature, and a data-fusion module to receive the feature location data from the image-processing module, and the movement data from the sensor, and estimate second predetermined degrees of freedom of a motion of the game controller.

The following are embodiments within the scope of this aspect.

The first predetermined degrees of freedom of the motion of the body part is at least two degrees of freedom. The second predetermined degrees of freedom of the motion of the game controller is at least two degrees of freedom. The sensor is installed in the game controller. The image-processing module is configured to identify a location in an image of the at least one identifiable visual feature on the game controller. The sensor includes at least one accelerometer.

The sensor includes at least one angular rate sensor. The sensor includes at least one magnetometer. The sensor includes a three-axis linear accelerometer. The sensor includes a three-axis angular rate sensor. The body part is at least one of the player's head, the player's face, the player's torso, one of the player's shoulders, one of the player's legs, one of the player's arms, one of the player's feet, one of the player's hands, one of the player's fingers, and one of the player's eyes.

A tracked motion of a player's head is used to control the viewpoint for rendering graphics in a game. A tracked motion of the body part is used to control a virtual representation of the body part in a game. A tracked motion of the body part is used to control the player's locomotion or navigation through the game world.

In an additional aspect, a method includes receiving a video signal from a webcam, the video signal based on at least one of a game controller and a body part of a player, generating movement data, the movement data corresponding to the motion of the game controller, in response to the video signal, tracking first predetermined degrees of freedom of motion of the body part, and generating feature location data based on a location of at least one identifiable visual feature, and based on the movement data, and the feature location data, estimating second predetermined degrees of freedom of a motion of the game controller.

The following are embodiments within the scope of this aspect.

The method also includes calibrating the webcam to have a view of at least one of the game controller and the body part. The first predetermined degrees of freedom of the motion of the body part is at least two degrees of freedom. The second predetermined degrees of freedom of the motion of the game controller is at least two degrees of freedom. The at least one identifiable visual feature is located on the game controller. The body part is at least one of the player's head, one of the player's arms, one of the player's feet, one of the player's hands, and one of the player's eyes.

In an additional aspect, disclosed is a computer-readable medium comprising instructions to cause a game console to receive a video signal from a webcam, the video signal based on at least one of a game controller and a body part of a player, generate movement data, the movement data corresponding to the motion of the game controller, in response to the video signal, track first predetermined degrees of freedom of motion of the body part, and generating feature location data based on a location of at least one identifiable visual feature, and based on the movement data, and the feature location data, estimate second predetermined degrees of freedom of a motion of the game controller.

In some embodiments, the medium also causes the game console to calibrate the webcam to have a view of at least one of the game controller and the body part.

One or more aspects may provide one or more advantages. The details of one or more embodiments of the invention are set forth in the accompanying drawings and the description below. Other features, objects, and advantages of the invention will be apparent from the description and drawings, and from the claims.

DESCRIPTION

Figure 1:
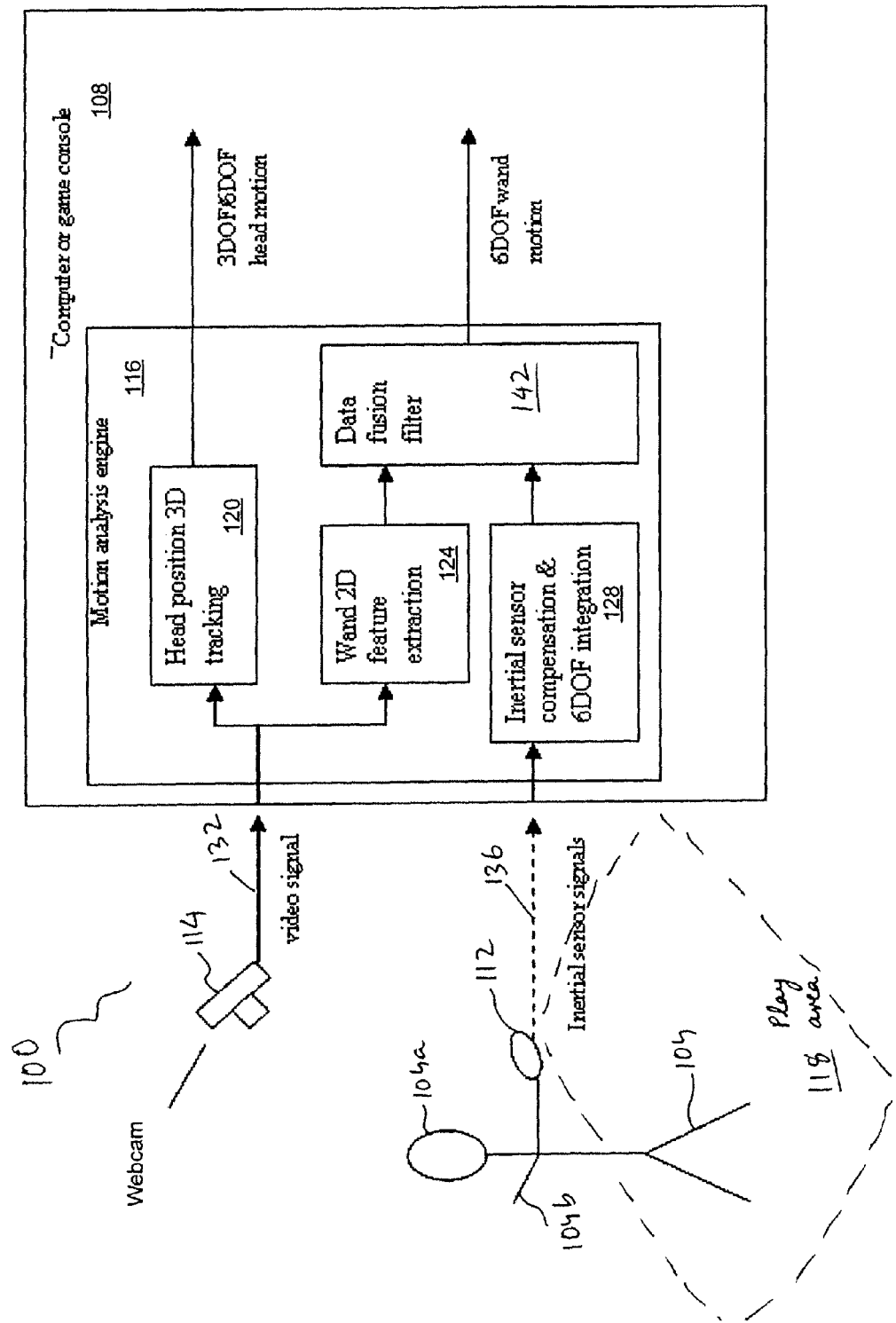
FIG. 1 is a block diagram of an exemplary game control system.

The Wii captures only part of information relating to movement, e.g., information regarding three-to-four degrees of freedom, with very low accuracy, whereas more advanced tracking technologies used in professional virtual reality (VR) systems capture the full six degrees of freedom in high fidelity. There would be a strong demand for more capable motion-tracking input devices for gaming if they could be made affordable enough for home use.

A wide variety of true 6-degree-of-freedom (6-DOF) motion-tracking systems are known in the professional VR industry, where they are used for applications such as user interaction with large-screen immersive displays, e.g., the CAVE™ and the PowerWall™. In these immersive projection technology (IPT) environments, stereoscopic graphics are rendered in real-time from a viewpoint which moves dynamically in response to a viewer's head location and viewing direction.

A motion-tracking system is installed in the display room to track a user's head pose for viewpoint control, and to track a handheld input device or wand which is used to select and manipulate objects in the virtual world, or to navigate through it. Examples of technologies used in such environments are magnetic trackers made by Polhemus and Ascension, both of Burlington, Vt.; hybrid acoustic-inertial tracking systems made by InterSense of Bedford, Mass.; and infrared (IR) optical tracking systems which track either retro-reflective targets or active IR LED targets.

In some examples, retro-reflective targets must be illuminated by a flash-ring of high-power IR LEDs mounted around each camera lens. Examples of manufacturers of IR tracking systems in the immersive displays market are ART of Munich, Germany and Vicon of Oxford, UK.

In addition to these widely-deployed commercial tracking systems, there are many research projects on alternative approaches, the most significant of which is the use of passive computer vision technology to track a user's body motions directly, with or without special tags or markers to be worn on the user's body.

Markerless tracking is particularly appealing, as it would allow users to step into and interact with a virtual environment without donning anything.

Early examples of such passive computer vision-based interaction with virtual worlds include the Vivid Group's Mandala VR system, Reality Fusion, and the MIT Alive project. In the console games market, computer vision-based tracking had a big success with the Sony "Eye Toy" accessory, and is also available with the Xbox360 "Live Vision" camera.

Any approach not based on computer vision is generally viewed as "active" or "sensor-based" or "instrumented" tracking. Typically, low-cost sensor-based tracking devices were ultrasonic, such as, the Mattel PowerGlove, the Logitech 6DOF Mouse, and the Pegasus Technologies' FreeD.

More recently, there have also been low-cost optical trackers, such as the Naturalpoint TrackIR, the Essential Reality P5 Glove, and the optical "sensor bar" that works with the Nintendo Wii-mote.

Finally, there are devices similar to traditional button-based gamepad controllers augmented with inertial sensors, such as the Microsoft Sidewinder and the Nintendo Wii-mote and Nunchuk. There is also at least one mechanical 3D motion tracker, the GameTrak from In2Games, which uses a pullstring encoder to measure the distance and direction from a base unit on the floor to a player's hand.

Instrumentation-based tracking provides far greater robustness, speed and precision than passive computer vision. Such tracking requires an electronic device with either batteries or wires. In the case of handheld game controllers with buttons, this is not a problem, since batteries or wires will be needed to transmit the button signals to the game console anyway.

Typically, gamers enjoy very precise, fast, and robust control using a handheld input device with buttons. This can be combined with inertial sensors, e.g., at least one accelerometer, to allow natural gestural interactions, e.g., swordplay, wand waving, fighting, punching, throwing, and swinging hand-held objects, e.g., racquets, clubs, and bats.

The use of inertial sensors in the controller provides a degree of speed, precision, and responsiveness that is typically not matched by computer-vision-tracked hand gestures. However, inertial sensors alone can only track motion for very brief intervals before position drift becomes excessive. In some examples, hybrid tracking system are formed by combining inertial sensors with another tracking system, such as, ultrasonic or optical tracking systems, to correct the drift.

For example, the InterSense IS-900 is a hybrid ultrasonic-inertial tracking system, and the InterSense IS-1200 is a hybrid optical-inertial tracking system. A version of the Intersense IS-1200 called VisTracker fuses inertial data with vision-based recognition of paper markers. Additional versions of the Intersense IS-1200 under development use active LED targets instead of paper markers, and have the ability to track using just one camera and as few as two LEDs using novel techniques described in co-pending U.S. application Ser. No. 11/543,008, "Tracking Objects With Markers," by Eric Foxlin, and Leonid Naimark, which is incorporated herein by reference in its entirety.

A hybrid optical/inertial or ultrasonic/inertial tracking system would be useful in handheld game controllers if it could be made at suitable cost. With the advent of very low-cost commodity "webcams," the possibility of producing a hybrid optical/inertial tracker at an affordable consumer price point is becoming realistic.

While using a tracked handheld game controller, a gamer can benefit from having some tracking, possibly to a lesser fidelity, of one or more additional body parts. For example, head-tracking can be used to provide parallax-correction to compensate for left-right motion of the gamer's eyes in front of a screen. Even without stereo glasses, a sense of 3d depth can be achieved by tracking head motion and rendering the virtual world from a matching point of view.

Furthermore, there have recently been introduced to the market several large-screen televisions which can update at 120 Hz and are therefore compatible with stereoscopic shutter glasses, e.g. 3D DLP Glasses from IO Display Systems of Sacramento, Calif., which can create a sense of 3D when combined with head-tracking. In addition to viewpoint control, head-tracking can be used in a game to allow the gamer to duck, or run in place, or otherwise control his avatar's behavior.

In some examples, head-tracking does not require as much speed or precision as hand-tracking, since it is not used to perform fine motor skills and highly dynamic gestures. Accordingly, 3-DOF head position tracking can suffice for most games.

Typically, head-position is easily tracked by passive computer-vision techniques. The head is large, relatively slow, less prone to occlusions, contains a large patch of skin which is usually a contrasting color to the clothing covering the rest of the body, and is predictably located at the top of the moving figure. In addition, the head contains a face with a predictable set of features, e.g., eyes, nose, and mouth, and typically one can assume that the face is oriented towards the camera if the gamer is watching the screen.

In light of these observations, for head-tracking, computer vision provides an ideal solution, since it can be made to work well enough to satisfy the relatively lower demands of head-tracking, without requiring the user to wear electronic devices on the head.

Conversely, where only wand-tracking is needed, computer vision would typically not provide satisfactory tracking of the highly dynamic and frequently occluded motion of the hand-controller. However, sensor-based tracking can be integrated into a controller which already contains wired or wireless means to transmit button signals.

Referring now to FIG. 1, a system 100 combining passive computer vision-based tracking with hybrid optical and inertial tracking is shown. A user 104 interacts with a computer or game console 108 using a game controller 112. The game controller 112 is typically an input device or "wand" adapted to be held in the user's 104 hand, and is used to interface with the game console 108. A webcam 114 tracks the movement of the user 104 and the game controller 112. The webcam 114 is typically an inexpensive camera mounted or placed on or near a display screen of the gaming interface (not shown) or anywhere behind the display screen, looking out towards a play area 118.

In some examples, the game console 108 includes a motion analysis engine 116, that further includes a vision-based tracking module 120, for tracking a certain body part of the user 104, e.g., the user's head 104a, and a hybrid optical-inertial tracking module 122, for tracking an instrumented device, e.g, the game controller 112.

The hybrid tracking module 122 consists of a 2D feature extraction module 124, for detecting visible features of the game controller 112, an inertial sensor and compensation module 128, and a data fusion module 142. The feature extraction module 124, the sensor and compensation module 128, and the data fusion module 142 combine to provide high-performance motion tracking of the game controller 112 by blending signals from inertial sensors with visual measurements of features on the same game controller 112 transmitted by the webcam 114.

In some examples, as described above, the vision based tracking module 120 is typically implemented using computer-vision systems and/or modules. The feature extraction module 124 is typically an image processing module implemented using image-processing algorithms.

In some examples, the different modules described above are used to track other body parts, or objects, in addition to, or instead of, the user's head 104a, or the game controller 112. For example, computer vision-based tracking of the non-dominant hand or arm, e.g., the hand 104b opposite from the hand holding the wand, i.e., the game controller 112, is used to raise and lower a "shield" while the wand is used to control a "sword."

Computer vision-based tracking of the shoulders or torso is used, for example, to control the direction or speed of movement through a simulated world by swaying or leaning or twisting, perhaps in a motion similar to skiing. Computer vision-based tracking of the legs is used, for example, to enable kicking, or walking or running in place.

Accordingly, sensor-based tracking of the game controller 112 is used to perform skill-based manual interactions that need to be tracked with a higher level of speed or precision, while at the same time computer vision-based tracking of the user's head 104, and/or other additional body parts, is used to control for example, viewpoint, locomotion, avatar animation, defensive blocking, or any other game play aspects which may not require quite as much speed or precision or reliability of tracking.

As described above, the system 100 achieves lower cost and installation complexity by using the webcam 114 to provide a video signal 132 for the vision based tracking module 120, and for the optical portion of the hybrid wand-tracker, the feature extraction module 124.

In some examples, the system 100 tracks the user's head 104a and the game controller 112 using different tracking methods. Accordingly, the user's head 104a is tracked by passive (marker-based or markerless) computer vision systems, without any special electronic devices on the user's head 104a. The game controller 112 is marked with at least one feature designed to be recognized in video imagery, such as, an LED, an area of contrasting color on the housing, a corner, an edge, a barcode, or a button.

The video signal 132 from the webcam 114 is fed into the motion analysis engine 116 of the game console 108 for processing. In some examples, inertial sensor signals 136 from the game controller 112 are also fed into the motion analysis engine 116. As shown, within the motion analysis engine 116, the video signal 132 is processed by the vision based tracking module 120 and the feature extraction module 124.

In some examples, the vision based tracking module 120 and the feature extraction module 124 incorporate two different sets of algorithms or vision processing subsystems. In some examples, the vision based tracking module 120 and the feature extraction module 124 share common software libraries and/or processing stages.

A position of the user's head 104a, and optionally some or all aspects of an orientation of the user's head 104a, is tracked by the vision based tracking module 120 using any algorithm known to persons with skill in the art for head or face tracking. Such algorithms can include, for example, some combination of static background subtraction, color segmentation based on skin color, morphological blob analysis, detection of tops of large moving blobs, facial feature detection, estimation of distances based on image size, 2D image plane tracking, or 3D tracking.

Separately, the same video signal 132 is analyzed by the feature extraction module 124. In some examples, each game controller 112, or wand, in use in the system 100 has special patterns of identifying marks to make it easier to find the game controller 112, or wand, in a cluttered video image.

For example, the special patterns can include a collinear strip of LEDs, in which the pattern of colors and/or spacings forms a unique identifier code. In some examples, the same can be done with color or monochrome marks printed on a plastic housing instead of LEDs. In some examples, the pattern can be a one point feature, or a collection of point features forming a particular geometric pattern, arranged in one, two or three dimensions.

In some examples, even a 1D (collinear) marker arrangement is sufficient for 6DOF tracking if the tilt of the webcam 114 is known, and the game controller 112 is equipped with accelerometers. The pitch and roll inclinations of the webcam 114 with respect to a level reference frame is typically required to properly fuse 2D (u,v) measurements of the webcam 114 with an inertial navigation solution in, for example, a data fusion filter module 142.

As shown, the data-fusion module 142 is configured to receive feature location data, i.e., information regarding the location in an image of at least one identifiable visual feature on, for example, the game controller 112, from the feature extraction module 124. In some examples, the data fusion filter module 142 also receives movement data from an inertial sensor (typically located on or in the game controller 112), after compensation by the inertial sensor compensation module 128. Using this information, the data fusion filter module 142 estimates at least two of the six degrees of freedom of motion of the game controller.

Many methods and algorithms for fusion of visual and inertial data are known to those skilled in the art. For example, a typical method employed in the Intersense IS-1200, described briefly above, is to integrate inertial measurement unit (IMU) signals to obtain rotation and translation estimates using algorithms typically found in an inertial navigation system (INS).

In some examples, optical or visual measurements are incorporated whenever they are available through a complementary Kalman filter designed to estimate the errors of the INS, as described in, for example, U.S. Pat. Nos. 5,645,077, 6,176,837, and 6,922,632, each incorporated herein by reference in its entirety.

Typically, for an IMU, a micro-electro-mechanical-systems (MEMS) IMU consisting of three orthogonal angular rate sensors or gyroscopes, and three orthogonal linear accelerometers, is used. These sensors are used to accurately perform full 6-DOF inertial tracking.

In some examples, the inertial sensor in the game controller 112 has fewer than six sensors to reduce costs. Also, the inertial sensor in the game controller 112 can incorporate non-inertial sensors, such as magnetometers either in addition to, or instead of, some of the inertial sensors.

In some examples, using techniques described in U.S. Pat. No. 5,645,077 referenced above, magnetometer data is fused with inertial data to prevent yaw drift to keep the game controller 112 active when out of viewing range of the webcam 114. In some examples, a sensor consisting of accelerometers and magnetometers can be used instead of accelerometers and gyroscopes to form a lower cost system which also has the potential to track 6-DOF motion.

In some examples, for convenience in automating calibration of the system 100, a specialized version of webcam 114 with built-in or add-on accelerometers is used. Alternatively, the system 100 uses an ordinary webcam 114 to perform calibration of webcam pitch and roll by the user 104, using the game controller 112 as a calibration device.

The user 104 of the system 100 performs a one-time intrinsic lens calibration of the webcam 114 after installing the tracking software engine and connecting the webcam 114. Then, the user 104 places the webcam 114, for example, on the top of a TV set, facing out into play area 118, e.g., the living room.

Subsequently, the user 104 performs tilt calibration, described below, by simply holding the game controller 112 in front of the webcam 114, and pushing a button. The user 104 then performs screen alignment calibration, also described below, by pointing a display screen cursor, controlled by the game controller 112, at two or three points, such as corners of the screen, and pushing a button at each point.

In some examples, if the user 104 moves the webcam 114, then the user 104 needs to perform the tilt calibration and screen alignment calibration again. If only the position and not the tilt of the camera has been changed, the user 104 can skip the tilt calibration.

Figure 2:
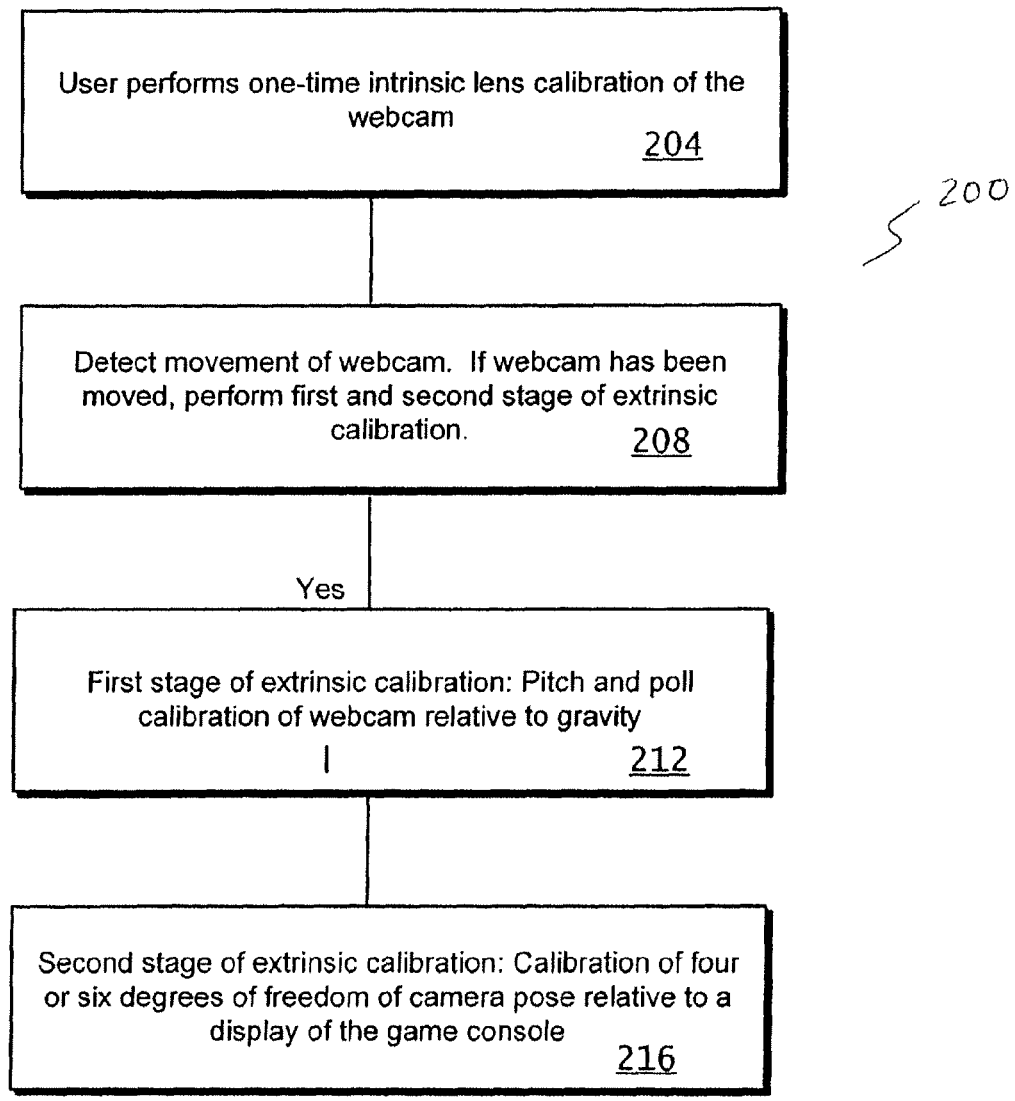
FIG. 2 is a flowchart depicting an exemplary calibration procedure.

FIG. 2 is a flowchart 200 showing the calibration procedure of the system 100. As shown, the user 104 typically performs a one-time intrinsic lens calibration of the webcam 114 prior to the first use of the system (step 204). In some examples, the intrinsic lens calibration of the webcam 114 is done by holding a calibration card in front of the webcam 114 in several different positions.

In some examples, it is not necessary to use an individually tailored calibration of the webcam 114, and the system 100 can instead use default intrinsic calibration parameters for a specific make and model of webcam 114 being used. In some examples, the system 100 is configured to auto-calibrate the camera intrinsic parameters without user intervention.

In examples which use custom intrinsic lens calibration, an intrinsic calibration module (not shown) performs automatic correspondences between the calibration points in different views, and then solves an optimization problem to determine the camera lens center point, focal length, and if necessary, in some examples, one or more radial distortion coefficients. The lens calibration data is saved with the software corresponding to the motion analysis engine 116 on the game console 116 and used to rectify all future image plane measurements from the same webcam 114.

Each time the webcam 114 is moved (step 208), the user 104 is prompted to perform an extrinsic calibration of the webcam 114 pose in two stages. In the first stage, the pitch and roll of the webcam 114 relative to gravity are calibrated (step 212).

If the game controller 112 is marked with at least four visual features, not all collinear, then the 6-DOF rigid pose of the webcam 114 with respect to the game controller 112 can be calculated from one image using any pose recovery algorithm known to those skilled in the art. Computer vision methods for recovering the pose of a camera from measured image locations of n points are sometimes known to those skilled in the art as Perspective-n-Point (PnP) pose recovery algorithms, or the "exterior orientation" problem, or simply "camera calibration"

At about the same time that the image is taken, accelerometer data is captured and used to calculate the pitch and roll of the game controller 112, or stated differently, the orientation up to an unknown rotation about a gravity vector.

Combining an orientation of the game controller 112 with a PnP pose recovery orientation yields an orientation of the webcam 114 up to an unknown rotation about the z (gravity) axis. In some examples, this one-frame inclination calibration of the webcam 114 can be repeated several times and the results combined for improved accuracy.

If the game controller 112 is only marked with three or more collinear visual features, a single image frame can only determine 5 degrees-of-freedom of the rigid transformation between the game controller 112 and the webcam 114. In this case, after combining with accelerometer pitch and roll estimates of the game controller 112, a rotation of the webcam 114 is indeterminate about z and one other axis. As a result, in some examples, it is necessary to capture at least two calibration images with the game controller 112 in two different orientations and combine them, after which the orientation of the webcam 114 is determined up to an unknown rotation about the z axis.

In some examples, if the game controller 112 is only marked with two visual features, it is still possible to determine the pose of the camera relative to multiple poses of the controller by combining multiple views and solving a bundle adjustment problem to find the 3d positions of the visual features at different times, incorporating constraints provided by the distance between the two features within each frame, and the inclination of the segment connecting the two. Once the point cloud has been solved and forced into a gravitationally leveled coordinate frame by the accelerometer data, the camera pose can be determined with respect to the leveled point-cloud frame using PnP pose recovery, and thus the camera pitch and roll have been determined.

In the second stage of extrinsic calibration, four or six degrees of freedom of the webcam 114 pose relative to a display of the game console 108 are calibrated (step 216). Having completed the camera tilt calibration procedure in step 212 above, it is then possible to begin tracking a pose of the game controller 112 relative to a coordinate frame with its origin at the webcam 114 and z axis vertical, for example, as described in the previously referenced U.S. application Ser. No. 11/543,008.

In some examples, at this point the user 104 may wish to establish a relationship between the tracking reference coordinate frame and the coordinate frame of the display screen, so that the game controller 112 is represented correctly in the display. If the display screen is known to be vertical and the top edge is level, then there are four unknown degrees of freedom in this transformation (x, y, z and yaw). If not, all six degrees of freedom need to be calibrated.

In some examples, by pointing the game controller 112 until a cursor is placed at a particular location on the screen, e.g. one of the corners, a measurement equation is obtained constraining two variables. As a result, the user 104 is prompted to point to at least two different control points on the screen to perform the 4-DOF calibration, and at least three different control points to perform the 6-DOF calibration.

The calibration steps described above represent just one possible method of calibrating the system 100. Other methods can be devised to simplify or eliminate the need for certain user procedures. In some examples, the system 100 is able to determine the tilt of the camera with respect to gravity automatically by identifying horizontal or vertical lines or surfaces in the field of view of the webcam 114, and deducing the webcam 114 pose with respect to these features.

In some examples, the webcam 114 is calibrated just once, and thereafter it automatically detects when it has been repositioned, and automatically recompute its calibration by determining the 6-DOF transformation between its former pose and the new pose using correspondences of several points in the room which can be seen and corresponded between the two views. A wide variety of algorithms for performing this type of so-called "relative orientation" algorithm, including the 7-point algorithm, the 8-point algorithm, the fundamental matrix and the essential matrix, are known to those skilled in the art.

The system 100 described above can be implemented in digital electronic circuitry, or in computer hardware, firmware, software, or in combinations of them. The vision based tracking module 120, the feature extraction module 124, the inertial sensor compensation module 128, and the data fusion filter 142, can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The system 100 can include clients and servers. A client and server are generally remote from each other and typically interact over a communication network. The relationship of client and server arises by virtue of computer programs running on the respective computers and having a client-server relationship to each other.

In some examples, the system 100 is implemented in a non-game-related application, such as an immersive virtual reality system, an IPT installation, a sports training or monitoring application, a fitness machine, a CAD system, a simulation and training system, or an augmented reality system. In many of these applications, similar advantages as described above apply, including, for example, an advantage of not having to wear active electronics on the head while at the same time achieving high-performance hybrid tracking for a handheld input device or controller.

In some examples, the webcam 114 can be either a typical webcam, or a high quality camera such as a firewire camera, USB2.0 camera, Ethernet camera, surveillance camera, CCTV camera or a machine vision camera, operating in the visible, IR or UV regions. In many applications, it might be necessary to track over a larger range than can be covered by a single camera. In this case, a multi-camera setup can be substituted for the single webcam 114. In some examples, this will require calibration of the mutual pose of the multiple cameras, which can be accomplished using some of the calibration techniques discussed above, or other techniques know to those skilled in the art.

Other embodiments are within the scope of the following claims. For example, the techniques described herein can be performed in a different order and still achieve desirable results.

What is claimed:

1. A system for tracking the motion of an input device held in or attached to a user's first body part and a user's second body part that is movable independently of said first body part, the system comprising:
    a motion sensor coupled to the input device, the sensor configured to generate movement data indicative of movement of the input device,
    a computer-vision module adapted to process video signals from a camera, and in response to the video signals, and without relying on any data derived from an electronic device held in or attached to the second body part, to track motion of the second body part,
    an image-processing module adapted to process the video signals, and in response to the video signals, to generate feature location data based on a location of at least one identifiable visual feature on the input device, and
    a data-fusion module adapted to receive the feature location data from the image-processing module, and the movement data from the sensor, and track motion of the input device.

2. The system of claim 1 in which the motion of the second body part includes at least two degrees of freedom.

3. The system of claim 1 in which the motion of the input device includes at least two degrees of freedom.

4. The system of claim 1 in which the sensor is installed in the input device.

5. The system of claim 1 in which the image-processing module is configured to identify a location in an image of the at least one identifiable visual feature on the input device.

6. The system of claim 1 in which the sensor includes at least one accelerometer.

7. The system of claim 1 in which the sensor includes at least one angular rate sensor.

8. The system of claim 1 in which the sensor includes at least one magnetometer.

9. The system of claim 1 in which the sensor includes a three-axis linear accelerometer.

10. The system of claim 1 in which the sensor includes a three-axis angular rate sensor.

11. The system of claim 1 in which a tracked motion of a player's head is used to control the viewpoint for rendering graphics in a game.

12. The system of claim 1 in which a tracked motion of the second body part is used to control a virtual representation of the second body part in a game.

13. The system of claim 1 in which a tracked motion of the second body part is used to control the player's locomotion or navigation through a game world.

14. A method performed by an information handling system comprising:
    receiving video signals from a camera, the video signals based on images of at least one of an input device held in or attached to a user's first body part and a second body part of a user that is movable independently of said first body part,
    using a motion sensor coupled to the input device to generate movement data, the movement data corresponding to the motion of the input device,
    using a computer vision module to process video signals from the camera to track motion of the second body part without relying on any data derived from an electronic device held in or attached to the second body part, and using an image processing module to process the video signals to generate feature location data based on a location of at least one identifiable visual feature on the input device, and
    using a data-fusion module to track motion of the input device based on the movement data, and the feature location data.

15. The method of claim 14 further comprising calibrating the camera to have a view of at least one of the input device and the second body part.

16. The method of claim 14 in which the motion of the body part has at least two degrees of freedom.

17. The method of claim 14 in which the motion of the input device has at least two degrees of freedom.

18. The method of claim 14 in which the at least one identifiable visual feature is located on the input device.

19. The method of claim 14 in which the second body part is at least one of the player's head, one of the player's arms, one of the player's feet, one of the player's hands, and one of the player's eyes.

20. A non-transitory computer-readable medium comprising instructions to cause a data processing system to:
    receive video signals from a camera, the video signals based on images of at least one of an input device held in or attached to a user's first body part and a second body part of a user that is movable independently of said first body part,
    generate movement data, the movement data corresponding to the motion of the input device,
    in response to the video signals, track motion of the second body part without relying on any data derived from an electronic devices held in or attached to the second body part, and generate feature location data based on a location of at least one identifiable visual feature, and
    based on the movement data, and the feature location data, track motion of the input device.

21. The medium of claim 20 further comprising instructions to cause the input device to calibrate the camera to have a view of at least one of the input device and the second body part.

22. The system of claim 1 in which the second body part is one of the user's head, the user's face, one or both of the user's eyes, or an object worn on the user's head or face, and the input device is held in one of the user's hands.

23. The system of claim 22 in which the input device is a game controller and the user is a game player.

24. The system of claim 22 in which the input device is a wand used to control an immersive visualization environment.

* * * * *